(12) United States Patent
Huang

(10) Patent No.: US 10,140,078 B2
(45) Date of Patent: Nov. 27, 2018

(54) DATA PROCESSING SYSTEM AND METHOD FOR GENERATING GUIDING NETWORK BASED ON REGIONAL LAYOUT IMAGE

(71) Applicant: PopWorld Inc., New Taipei (TW)

(72) Inventor: Sheng-Hung Huang, New Taipei (TW)

(73) Assignee: POPWORLD INC., New Taipei (TW)

( * ) Notice: Subject to any disclaimer, the term of this patent is extended or adjusted under 35 U.S.C. 154(b) by 218 days.

(21) Appl. No.: 15/257,123

(22) Filed: Sep. 6, 2016

(65) Prior Publication Data

US 2017/0075637 A1 Mar. 16, 2017

(30) Foreign Application Priority Data

Sep. 11, 2015 (TW) .............................. 104130134 A

(51) Int. Cl.
| | |
|---|---|
| *G06F 3/13* | (2006.01) |
| *G06F 3/14* | (2006.01) |
| *H04W 4/02* | (2018.01) |
| *G01C 21/26* | (2006.01) |

(52) U.S. Cl.
CPC ............ *G06F 3/14* (2013.01); *G01C 21/265* (2013.01); *H04W 4/02* (2013.01); *G09G 2370/025* (2013.01); *G09G 2370/042* (2013.01)

(58) Field of Classification Search
CPC .......... G06F 3/14; G01C 21/265; H04W 4/02; G09G 2370/025; G09G 2370/042
See application file for complete search history.

(56) References Cited

U.S. PATENT DOCUMENTS

| | | | | |
|---|---|---|---|---|
| 9,743,376 | B2 * | 8/2017 | Paek ...................... | H04W 4/02 |
| 2015/0073700 | A1 * | 3/2015 | Huang .................... | H04W 4/21 |
| | | | | 701/438 |
| 2017/0075637 | A1 * | 3/2017 | Huang ................. | G01C 21/265 |

* cited by examiner

*Primary Examiner* — Sejoon Ahn
(74) *Attorney, Agent, or Firm* — Muncy, Geissler, Olds & Lowe, P.C.

(57) ABSTRACT

The invention discloses a data processing system and method for generating a guiding network. The data processing system according to a preferred embodiment of the invention includes an editing module and a processing module. Through the editing module, an editor uploads a regional layout image, labels M rational coordinates based on the regional layout image, selects N positioning points from the M rational coordinates, selects K information triggering points from the M rational coordinates, and selectively creates links between neighboring rational coordinates in the M rational coordinates. The processing module functions in generating the guiding network according to the regional layout image, the M rational coordinates, the N positioning points, the K information triggering points and the links.

2 Claims, 7 Drawing Sheets

DATA PROCESSING SYSTEM AND METHOD FOR GENERATING GUIDING NETWORK BASED ON REGIONAL LAYOUT IMAGE

CROSS-REFERENCE TO RELATED APPLICATION

This utility application claims priority to Taiwan Application Serial Number 104130134, filed Sep. 11, 2015, which is incorporated herein by reference.

BACKGROUND OF THE INVENTION

1. Field of the invention

The invention relates to a data processing system and method for generating guiding network, and more in particular, to a data processing system and method for generating a guiding network based on a regional layout image.

2. Description of the prior art

As positioning systems and mobile communication apparatuses are popular, displaying of geographical maps on mobile communication apparatuses are popular more and more due to navigation or other purposes. So far, if a guiding system or a navigation system need to be built for a specific region such as an exhibition, a shopping mall, a museum, a playground, a school, etc., it is just processed under specific project. In addition, if facilities in aforesaid specific regions change, it is difficult for the guiding system or the navigation system to be amended correspondingly in time.

Therefore, at present, there is no universal technology been developed to make users being guided in aforesaid specific regions by use of mobile communication apparatuses.

SUMMARY OF THE INVENTION

Accordingly, one scope of the invention is to provide a data processing system and method for generating a guiding network based on a regional layout image. Thereby, users can use mobile communication apparatuses to be guided in aforesaid specific regions by use of the guiding network generated by the data processing system and method of the invention.

A data processing system, according to a preferred embodiment of the invention, functions in generating a guiding network. The data processing of the invention includes an editing module and a processing module. An editor through the editing module performs to upload a regional layout image, to label M rational coordinates based on the regional layout image, to select N positioning points from the M rational coordinates, to select K information triggering points from the M rational coordinates, and to selectively create a plurality of links between neighboring rational coordinates in the M rational coordinates, where M is a natural number, N and K are respectively a positive integer less than or equal to M, and (N+K) is less than or equal to M. The processing module functioning in generating the guiding network according to the regional layout image, the M rational coordinates, the N positioning points, the K information triggering points and the links.

In one embodiment, the processing module also generates a guiding program including the guiding network. The guiding program can be executed on a mobile communication platform.

In one embodiment, the regional layout image corresponds to a physically regional layout. In the physically regional layout, each of a plurality of identification signal transmitter is installed at one of a plurality of positions which each corresponds to one of the N positioning points and the K information triggering points. The editor uploads through the editing module a plurality of identification codes. Each of the identification codes corresponds to one of the identification signal transmitters, the positioning points and the information triggering points. The guiding network also includes the identification codes.

In one embodiment, the data processing system of the invention further includes a transmitting module. The transmitting module is coupled to the processing module, and capable of communicating with a mobile communication apparatus operated by a user. The mobile communication apparatus includes the mobile communication platform and a displaying device. The user transmits a request information to the processing module through the mobile communication apparatus. The processing module transmits the guiding program to the mobile communication apparatus through the transmitting module in accordance with the request information. The mobile communication apparatus executes the guiding program to display the regional layout image and the K information triggering points on the displaying device. When the mobile communication apparatus receives the identification signal transmitted from one of the identification signal transmitters, the mobile communication apparatus executes the guiding program also to display a user current position on the displaying device, where the user current position corresponds to said one positioning point or said one information triggering point corresponding to the received identification signal. When the user selects a destination corresponding to one of the information triggering points under a condition of displaying the user current position, the mobile communication apparatus executes the guiding program also to determine a guiding route according to the user current position, the destination and the guiding network, and to display the guiding route on the displaying device.

A data processing method, according to another preferred embodiment of the invention, functions in generating a guiding network. The data processing method of the invention is, firstly, to upload a regional layout image. Next, the data processing method of the invention is to label M rational coordinates on the basis of the regional layout image, where M is a natural number. Then, the data processing method of the invention is to select N positioning points from the M rational coordinates, where N is a positive integer less than or equal to M. Afterwards, the data processing method of the invention is to select K information triggering points from the M rational coordinates, where K is a positive integer less than or equal to M, (N+K) is less than or equal to M. Subsequently, the data processing method of the invention is to selectively create a plurality of links between neighboring rational coordinates in the M rational coordinates. Finally, the data processing method of the invention is to generate the guiding network according to the regional layout image, the M rational coordinates, the N positioning points, the K information triggering points and the links.

In one embodiment, the data processing method of the invention is further to generate a guiding program including the guiding network, where the guiding program can be executed on a mobile communication platform.

In one embodiment, the regional layout image corresponds to a physically regional layout. In the physically regional layout, each of a plurality of identification signal transmitter is installed at one of a plurality of positions which each corresponds to one of the N positioning points and the K information triggering points. A plurality of identification codes, which each corresponds to one of the identification signal transmitters, the positioning points and the information triggering points, are uploaded. The guiding network includes the identification codes.

In one embodiment, a user operates a mobile communication apparatus to load the guiding program therein. The mobile communication apparatus includes the mobile communication platform and a displaying device. The mobile communication apparatus executes the guiding program to display the regional layout image and the K information triggering points on the displaying device. When the mobile communication apparatus receives the identification signal transmitted from one of the identification signal transmitters, the mobile communication apparatus executes the guiding program also to display a user current position on the displaying device, where the user current position corresponds to said one positioning point or said one information triggering point corresponding to the received identification signal. When the user selects a destination corresponding to one of the information triggering points under a condition of displaying the user current position, the mobile communication apparatus executes the guiding program also to determine a guiding route according to the user current position, the destination and the guiding network, and to display the guiding route on the displaying device.

In one embodiment, the regional layout image, the N positioning points and the K information triggering points all are assigned an identical group code. The mobile communication apparatus executes the guiding program to perform the steps of: when the mobile communication apparatus receives said one identification signal, retrieving the group code corresponding to said one identification code first, and then displaying the regional layout image and the K information triggering points corresponding to the group code.

Distinguishable from the prior art, the data processing system and method of the invention can provide unprecedented and low-cost solution for generating a guiding network. Thereby, users can use mobile communication apparatuses to be guided in aforesaid specific regions by use of the guiding network generated by the data processing system and method of the invention. If facilities in aforesaid specific regions change, the data processing system and method of the invention can amend the guiding network correspondingly in time. If aforesaid specific regions have different sub-regions such as different floors in a shopping mall, by the data processing system and method of the invention, the user's mobile communication apparatus can automatically switch into the regional layout image corresponding to the sub-region as the user passes the sub-region.

The advantage and spirit of the invention may be understood by the following recitations together with the appended drawings.

BRIEF DESCRIPTION OF THE APPENDED DRAWINGS

FIG. 1 is a schematic diagram showing the architecture of a data processing system according to a preferred embodiment of the invention.

FIGS. 2 to 6 schematically showing the regional layout image, which is used to generated the guiding network, during being edited.

FIGS. 7 to 9 schematically showing the displaying device of the mobile communication apparatus during executing the guiding program.

DETAILED DESCRIPTION OF THE INVENTION

Referring to FIGS. 1 through 6, FIG. 1 schematically shows an architecture of a data processing system 1 according to a preferred embodiment of the invention. FIGS. 2 to 6 schematically showing the regional layout image 20, which is used to generated the guiding network 28, during being edited.

Figure 1:
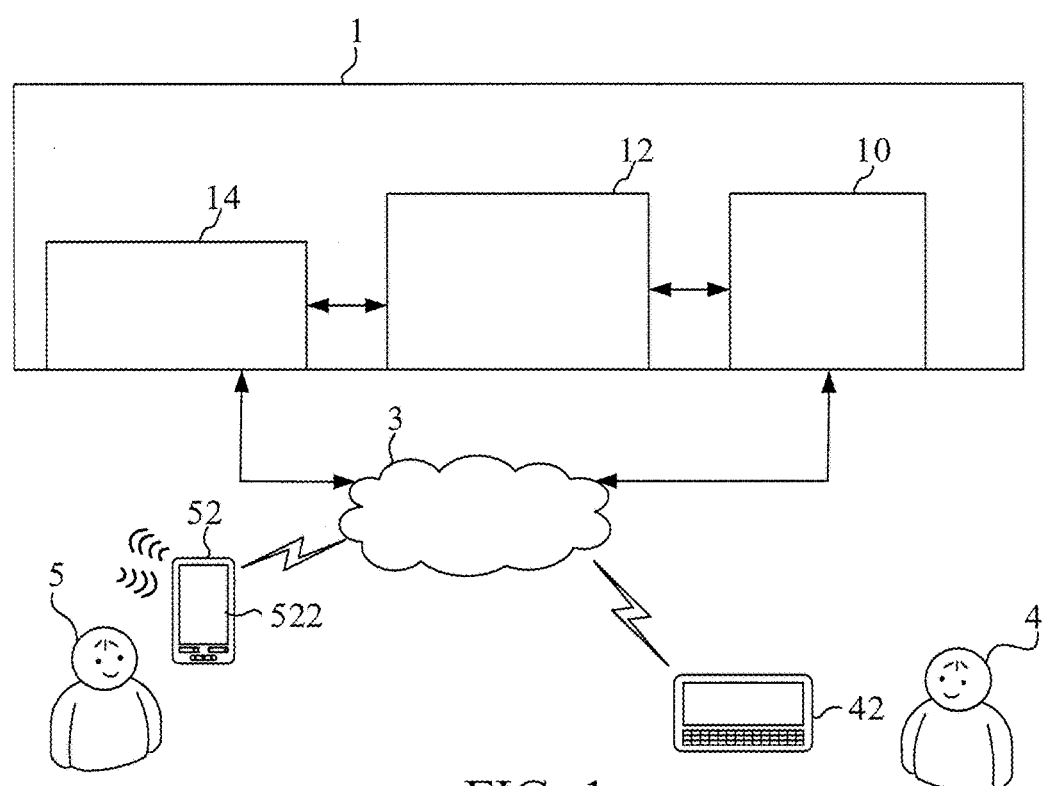

As shown in FIG. 1, the data processing system 1 of the invention includes an editing module 10 and a processing module 12. The data processing system 1 of the invention can be linked to a network 3.

An editor 4 holds a data processing apparatus 42 capable of being linked to the network 3. In practical application, the data processing apparatus 42 can be a desktop computer, a notebook computer, a tablet computer, a mobile phone, or other data processing apparatus. The editor 4 operates the data processing apparatus 42 to communicate with and access data from the data processing system 1 of the invention through the network 3.

Figure 2:
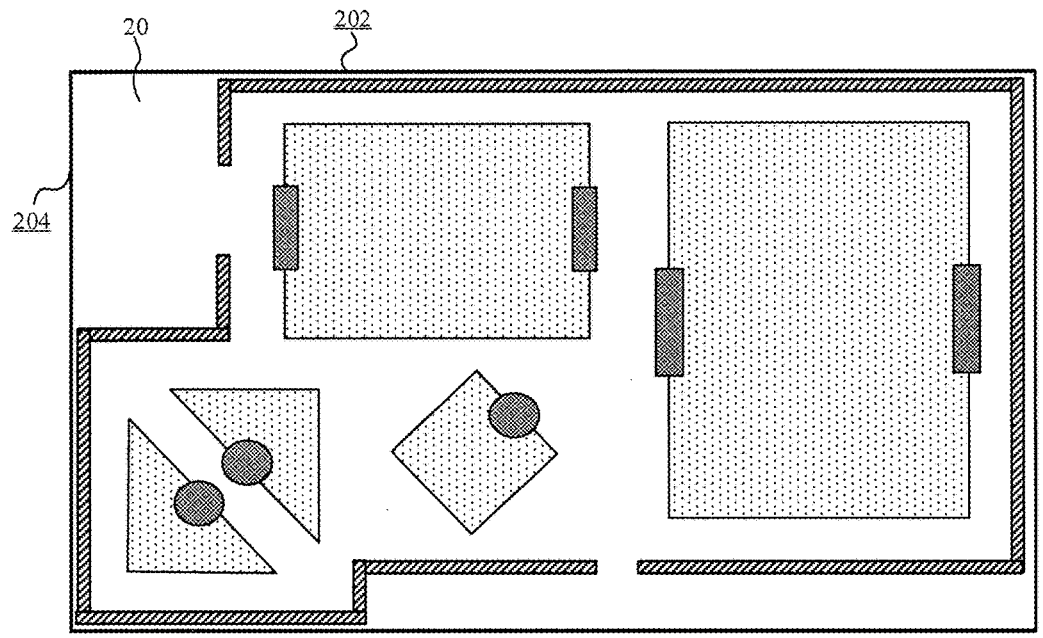

The editor 4 operates the data processing apparatus 42 through the editing module 10 to upload a regional layout image 20, e.g., the regional layout image 20 of the exhibition as shown in FIG. 2. The regional layout image 20 of the exhibition shown in FIG. 2 substantially is divided into a walkable region and a non-walkable region.

Figure 3:
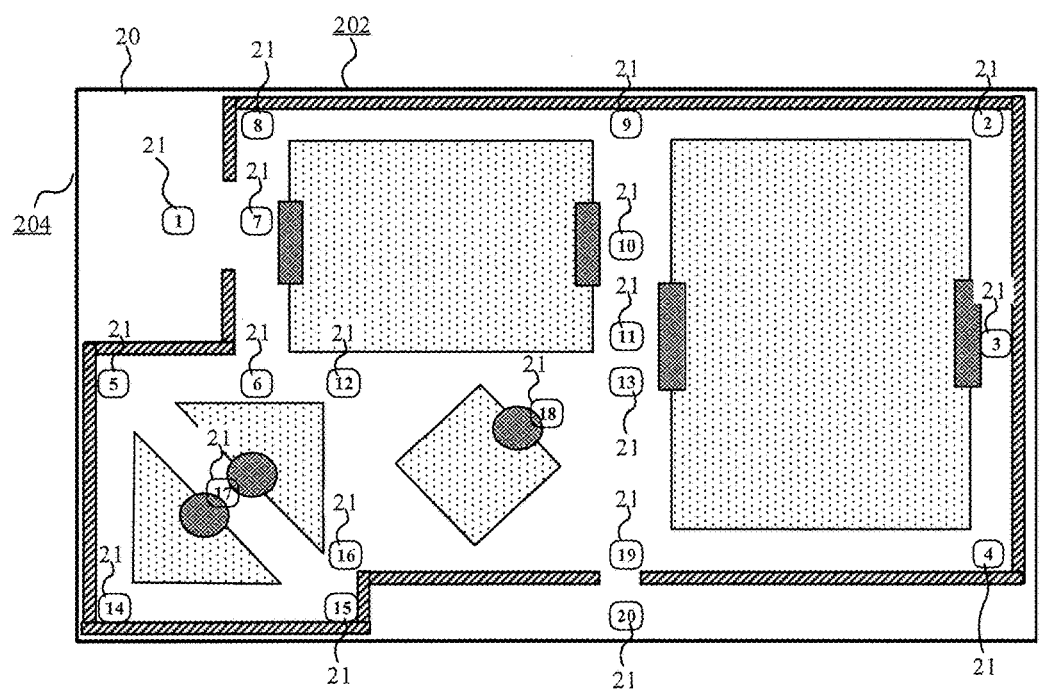

As shown in FIG. 3, the editor 3 though the editing module 10 labels M rational coordinates 21 on the regional layout image 20 based on the regional layout image 20, where M is a natural number. The so-called rational coordinates 21 herein represent the position coordinates which the editor 4 labels in the walkable region of the regional layout image 20 by the shown regional layout image 20. In FIG. 3, the blocks labeled in numbers 1~20 represent rational coordinates 21. The numbers in the blocks are given automatically in order as the editor 4 labels the rational coordinates 21 one by one, and do not relate to proximity relationship between the rational coordinates 21.

In one embodiment, as shown in FIG. 3, the regional layout image 20 thereof defines a length side 202 and a width side 204 perpendicular to the length side 202, and has a total length and a total width. Each of the rational coordinates 21 is defined as the percentage of the distance thereof from the width side 204 in the total length and the percentage of the distance thereof from the length side 202 in the total width, but not limited to. For example, the rational coordinate 21 labeled in number 1 has coordinate values of (95%, 5%), these coordinate values mean that the rational coordinate 21 labeled in number 1 has the percentage of 95% of the distance thereof from the width side 204 in the total length and the percentage of 5% of the distance from the length side 202 in the total width. The rational coordinate 21 labeled in number 3 has coordinate values of (95%, 30%), these coordinate values mean that the rational coordinate 21 labeled in number 3 has the percentage of 95% of the distance thereof from the width side 204 in the total length and the percentage of 30% of the distance from the length side 202 in the total width.

Figure 4:
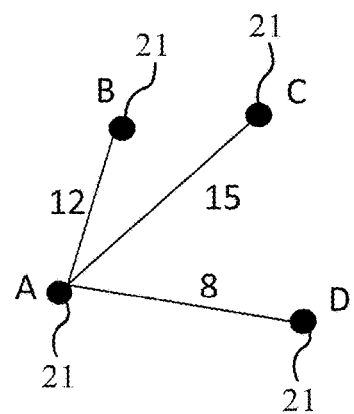

In another embodiment, each of the rational coordinates 21 is defined as the relationship among other rational coordinates 21, but not limited to. For example, one of the rational coordinates 21 is defined as (neighboring rational coordinate, distance). For example, as shown in FIG. 4, the rational coordinate 21 labeled in character A has 12 units apart from the rational coordinate 21 labeled in character B, 15 units apart from the rational coordinate 21 labeled in character C, and 8 units apart from the rational coordinate 21 labeled in character D. Therefore, the rational coordinate 21 labeled in character A is defined as (B: 12, C: 15, D: 8).

Figure 5:
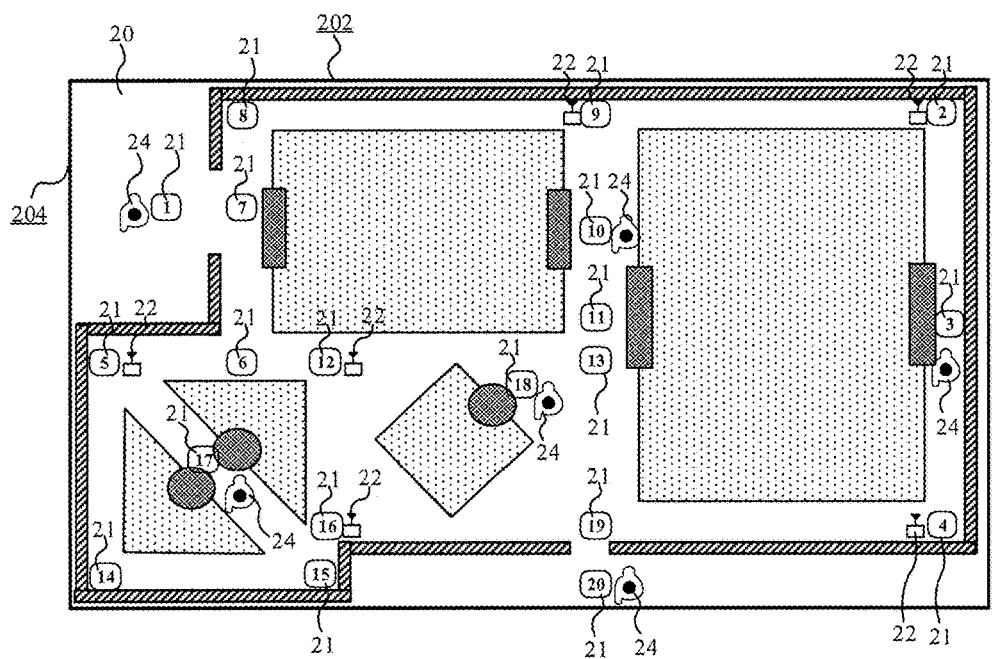

As shown in FIG. 5, the editor 4 through the editing module 10 selects N positioning points 22 from the M rational coordinates 21, where N is a positive integer less than or equal to M.

Also as shown in FIG. 5, the editor 4 through the editing module 10 also selects K information triggering points 24 from the M rational coordinates 21, where K is a positive integer less than or equal to M, and (N+K) is less than or equal to M.

Figure 6:
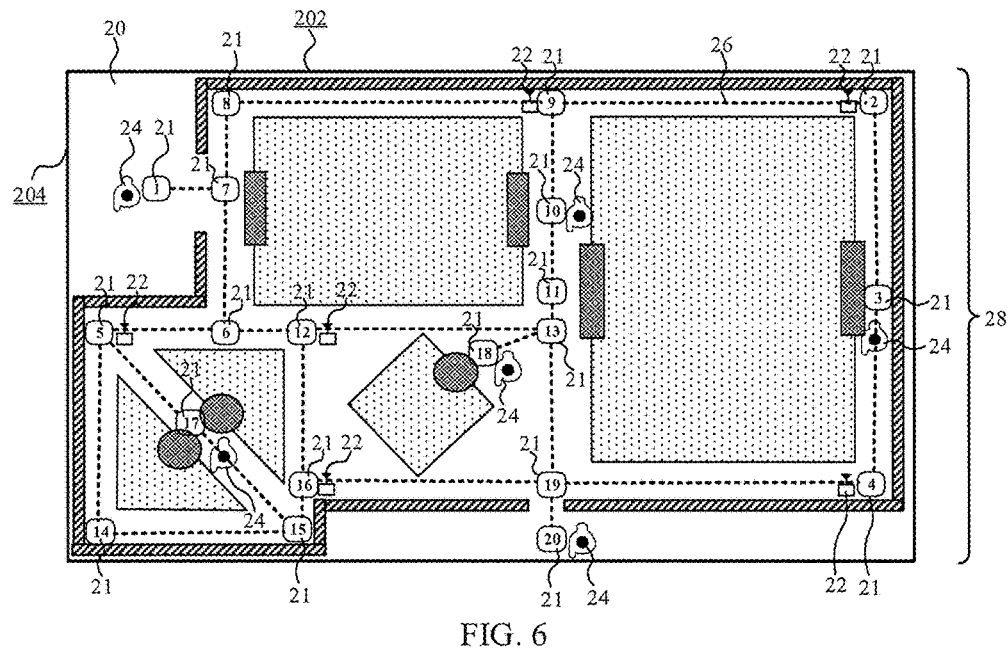

As shown in FIG. 6, the editor 4 through the editing module 10 also selectively creates a plurality of links 26 between neighboring rational coordinates 21 in the M rational coordinates 21.

The processing module 12 is coupled to the editing module 10. The processing module 12 functioning in generating the guiding network 28 according to the regional layout image 20, the M rational coordinates 21, the N positioning points 22, the K information triggering points 24 and the links 26. The guiding network 28 also records the distances between the linked rational coordinates 21.

In one embodiment, the processing module also generates a guiding program including the guiding network. The guiding program can be executed on a mobile communication platform.

In general, most of aforesaid specific regions, such as exhibitions, shopping malls, museums, playgrounds, schools, etc., have regional layout images thereof. Therefore, the data processing system 1 according to the preferred embodiment of the invention can easily generate the guiding network 28 with low cost. In addition, if facilities in aforesaid specific regions change, the data processing system 1 of the invention can amend the guiding network 28 correspondingly in time.

In one embodiment, the processing module 12 also generates a guiding program including the guiding network 28. The guiding program can be executed on a mobile communication platform. For example, the guiding program can be an application capable of being executed on iOS, Android, Window or other mobile communication platform.

In one embodiment, the regional layout image 20 corresponds to a physically regional layout. In the physically regional layout, each of a plurality of identification signal transmitter is installed at one of a plurality of positions which each corresponds to one of the N positioning points 22 and the K information triggering points 24. The editor 4 uploads through the editing module 10 a plurality of identification codes. Each of the identification codes corresponds to one of the identification signal transmitters, the positioning points 22 and the information triggering points 24. In particular, the guiding network 28 also includes the identification codes.

In one embodiment, as shown in FIG. 1, the data processing system of the invention further includes a transmitting module 14. The transmitting module 14 is coupled to the processing module 13, and capable of communicating with a mobile communication apparatus 52 operated by a user 5.

The mobile communication apparatus 52 includes the mobile communication platform and a displaying device 522.

The user 5 transmits a request information to the processing module 12 through the mobile communication apparatus 52 and the transmitting module 14. The processing module 12 transmits the guiding program to the mobile communication apparatus 52 through the transmitting module 14 in accordance with the request information. In practical application, the guiding program can be an application capable of being executed on the mobile communication platform.

Figure 7:
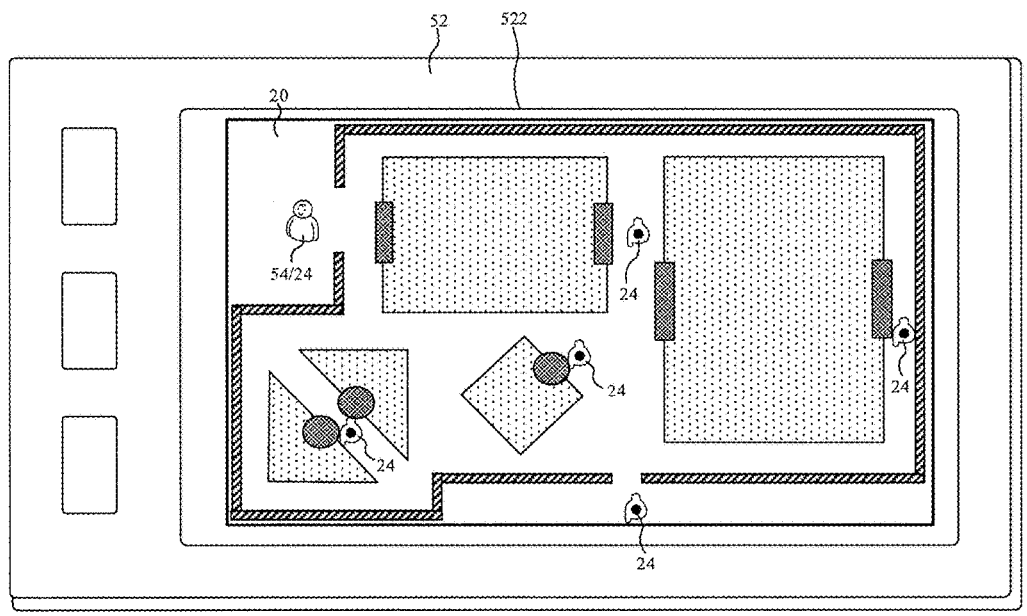

The mobile communication apparatus 52 executes the guiding program to display the regional layout image 20 and the K information triggering points 24 on the displaying device 522. When the mobile communication apparatus 52 receives the identification signal transmitted from one of the identification signal transmitters, the mobile communication apparatus 52 executes the guiding program also to display a user current position 54 on the displaying device 522, where the user current position 54 corresponds to said one positioning point 22 or said one information triggering point 24 corresponding to the received identification signal, e.g., the user current position 54 corresponding to the rational coordinate 21 labeled in number 1 as shown in FIG. 7. When the user 5 selects a destination corresponding to one of the information triggering points 24 under a condition of displaying the user current position 54 (for example, the information triggering point 24 corresponding to the rational coordinate 21 labeled in number 10), the mobile communication apparatus 52 executes the guiding program also to determine a guiding route 56 according to the user current position 54, the destination and the guiding network 28, and to display the guiding route 56 on the displaying device 522, as shown in FIG. 8.

In one embodiment, the guiding program calculates the shortest distance to determine the guiding route 56 in accordance with the distances between linked rational coordinate 21 recorded in the guiding network 28.

Figure 8:
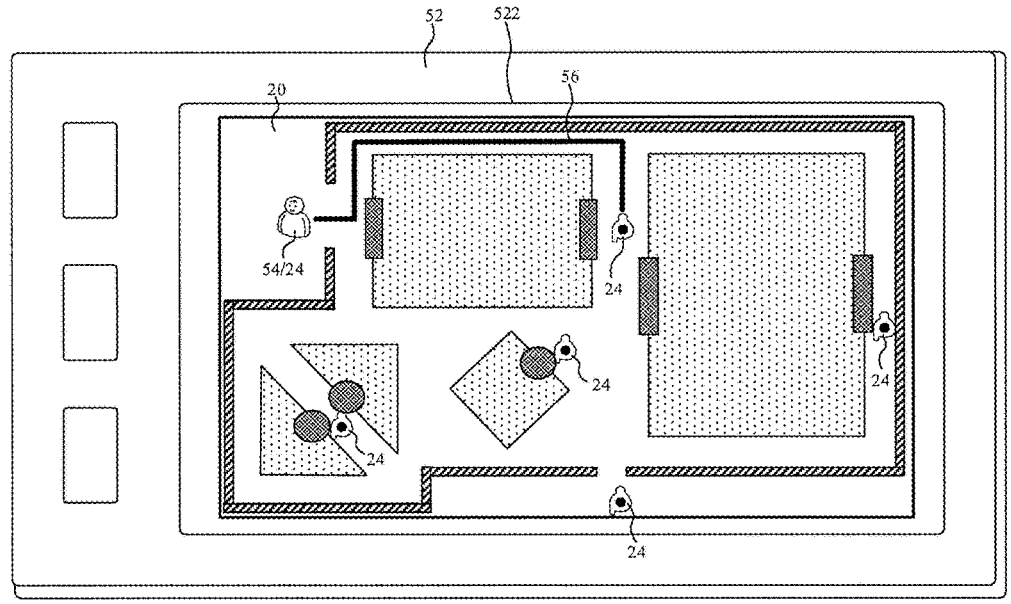
Figure 9:
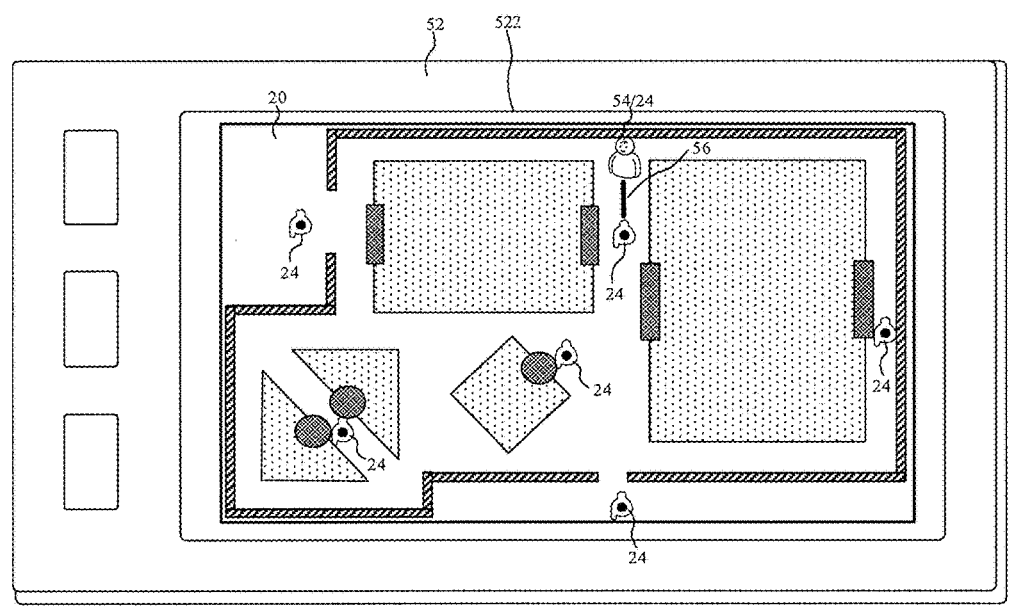

In practical application, only one positioning point 22 exists on the guiding route 56 as shown in FIG. 8, i.e., the positioning point 22 corresponding to the rational coordinate 21 labeled in number 9. Therefore, as shown in FIG. 9, during walking of the user 5 along the real route corresponding to the guiding route 56, the user current position 54 is only shown at the positioning point 22 corresponding to the rational coordinate 21 labeled in number 9.

In one embodiment, the identification signal can be transmitted in a Bluetooth protocol, a Wi-Fi protocol, an LTE protocol, IEEE 802.11-based protocols, a Zigbee protocol, a Z-wave protocol or other wireless communication protocols.

In practical application, when the user 5 holds the mobile communication apparatus 52 and walks to one information triggering point 24, the mobile communication apparatus 42 is triggered to load the guiding information corresponding to said one information triggering point 24, and to play back the loaded guiding information.

In one embodiment, the regional layout image 20, the N positioning points 22 and the K information triggering points 24 all are assigned an identical group code. The mobile communication apparatus 52 executes the guiding program to perform the steps of: when the mobile communication apparatus 52 receives said one identification signal, retrieving the group code corresponding to said one identification code first, and then displaying the regional layout image 20 and the K information triggering points 24 corresponding to the group code. Thereby, if aforesaid specific regions have different sub-regions such as different floors in a shopping mall, by the data processing system 1 of the invention, the user's mobile communication apparatus 52 can automatically switch into the regional layout image 20 corresponding to the sub-region as the user passes the sub-region.

Figure 10:
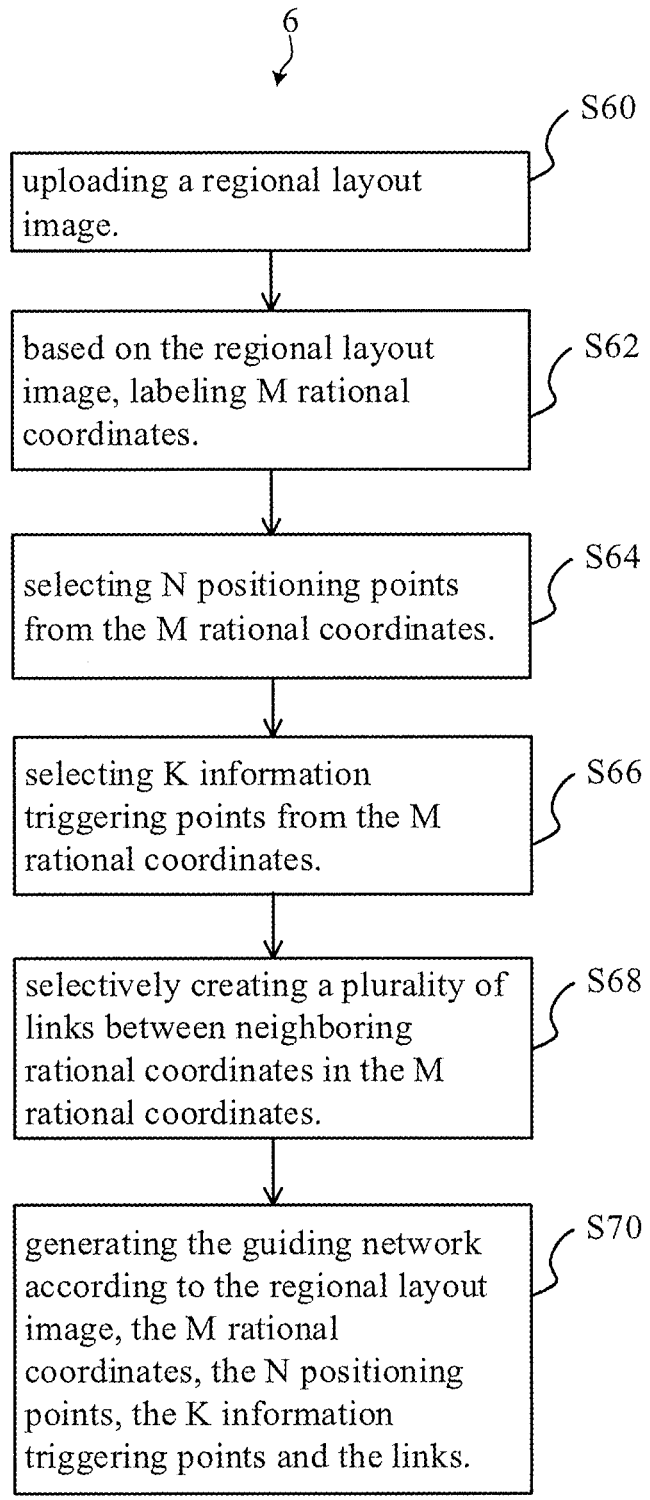
FIG. 10 is a flowchart diagram illustrating a data processing method according to another preferred embodiment of the invention.

Referring to FIG. 10, FIG. 10 is a flowchart diagram illustrating the data processing method 6, according to another preferred embodiment of the invention, for generating the guiding network 28 as shown in FIG. 6. The data processing method 6 of the invention, firstly, performs step S60 to upload a regional layout image.

Next, the data processing method 6 of the invention performs step S62 to label M rational coordinates on the basis of the regional layout image, where M is a natural number.

Then, the data processing method 6 of the invention performs step S64 to select N positioning points from the M rational coordinates, where N is a positive integer less than or equal to M.

Afterwards, the data processing method 6 of the invention performs step S66 to select K information triggering points from the M rational coordinates, where K is a positive integer less than or equal to M, (N+K) is less than or equal to M.

Subsequently, the data processing method 6 of the invention performs step S68 to selectively create a plurality of links between neighboring rational coordinates in the M rational coordinates.

Finally, the data processing method 6 of the invention performs step S70 to generate the guiding network according to the regional layout image, the M rational coordinates, the N positioning points, the K information triggering points and the links.

Figure 11:
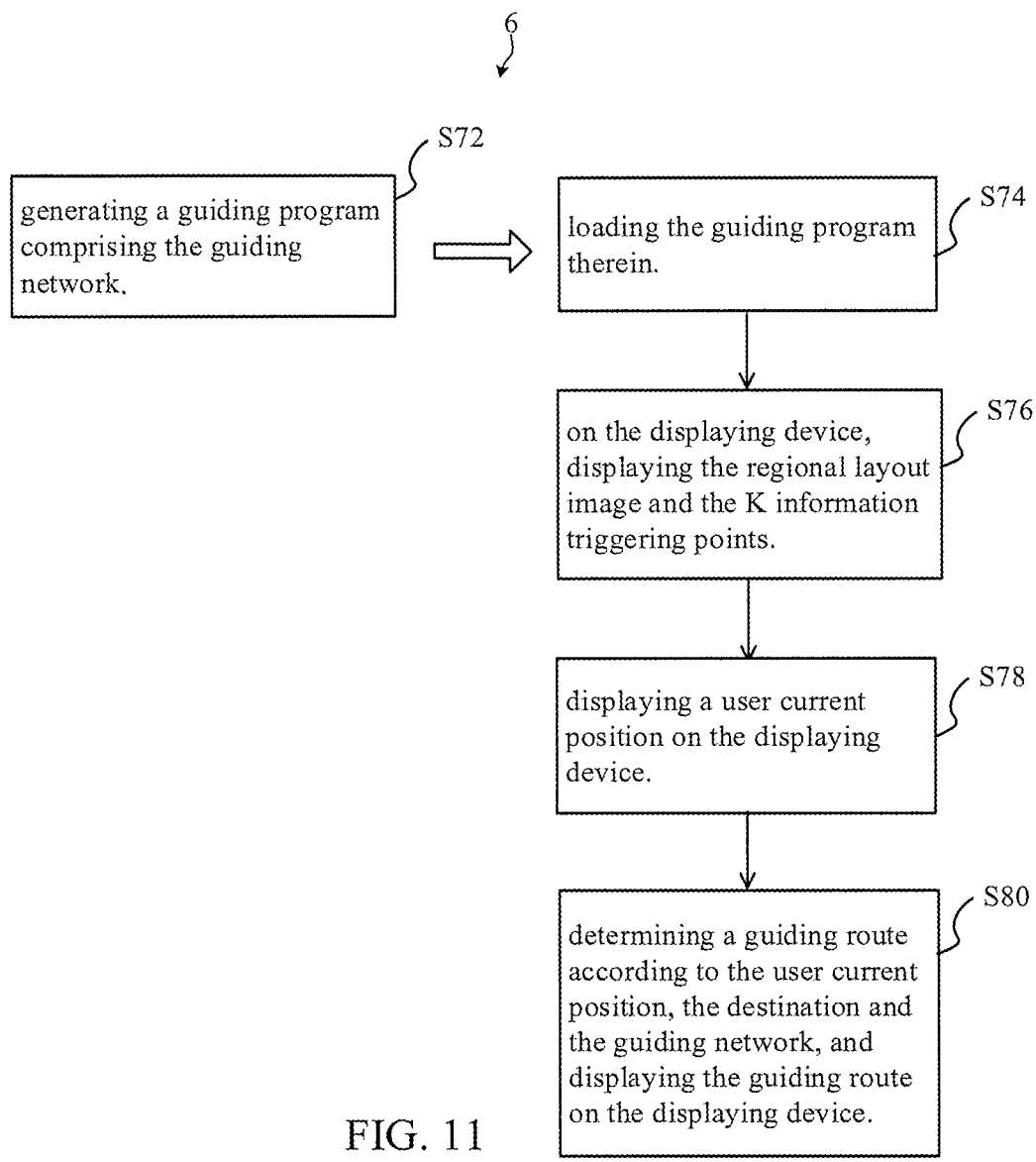
FIG. 11 is a flowchart illustrating further steps of the data processing method of the invention and steps of execution on the mobile communication apparatus.

In one embodiment, as shown in FIG. 11, furtherly, the data processing method 6 of the invention performs step S72 to generate a guiding program including the guiding network. The guiding program can be executed on a mobile communication platform. For example, the guiding program can be an application capable of being executed on iOS, Android, Window or other mobile communication platform.

In one embodiment, the regional layout image corresponds to a physically regional layout. In the physically regional layout, each of a plurality of identification signal transmitter is installed at one of a plurality of positions which each corresponds to one of the N positioning points and the K information triggering points. A plurality of identification codes, which each corresponds to one of the identification signal transmitters, the positioning points and the information triggering points, are uploaded. The guiding network includes the identification codes.

In one embodiment, a user operates a mobile communication apparatus to perform step S74 in FIG. 11 to load the guiding program therein. The mobile communication apparatus includes the mobile communication platform and a displaying device. The mobile communication apparatus executes the guiding program to perform, firstly, step S76 in FIG. 11 to display the regional layout image and the K information triggering points on the displaying device. Next, the mobile communication apparatus executes the guiding program to perform step S78, when the mobile communication apparatus receives the identification signal transmitted from one of the identification signal transmitters, the mobile communication apparatus executes the guiding program also to display a user current position on the displaying device, where the user current position corresponds to said one positioning point or said one information triggering point corresponding to the received identification signal.

Finally, the mobile communication apparatus executes the guiding program to perform step S80, when the user selects a destination corresponding to one of the information triggering points under a condition of displaying the user current position, the mobile communication apparatus executes the guiding program also to determine a guiding route according to the user current position, the destination and the guiding network, and to display the guiding route on the displaying device.

In one embodiment, the regional layout image, the N positioning points and the K information triggering points all are assigned an identical group code. The mobile communication apparatus executes the guiding program to perform the steps of: when the mobile communication apparatus receives said one identification signal, retrieving the group code corresponding to said one identification code first, and then displaying the regional layout image and the K information triggering points corresponding to the group code. Thereby, if aforesaid specific regions have different sub-regions such as different floors in a shopping mall, by the data processing method 6 of the invention, the user's mobile communication apparatus can automatically switch into the regional layout image corresponding to the sub-region as the user passes the sub-region.

Distinguishable from the prior art, the data processing system and method of the invention can provide unprecedented and low-cost solution for generating a guiding network. Thereby, users can use mobile communication apparatuses to be guided in aforesaid specific regions by use of the guiding network generated by the data processing system and method of the invention. If facilities in aforesaid specific regions change, the data processing system and method of the invention can amend the guiding network correspondingly in time. If aforesaid specific regions have different sub-regions such as different floors in a shopping mall, by the data processing system and method of the invention, the user's mobile communication apparatus can automatically switch into the regional layout image corresponding to the sub-region as the user passes the sub-region.

With detailed description of above preferred embodiment of the invention, it can be easily understood that the data processing system and method of the invention can provide unprecedented and low-cost solution for generating a guiding network. Thereby, users can use mobile communication apparatuses to be guided in aforesaid specific regions by use of the guiding network generated by the data processing system and method of the invention. If facilities in aforesaid specific regions change, the data processing system and method of the invention can amend the guiding network correspondingly in time. If aforesaid specific regions have different sub-regions such as different floors in a shopping mall, by the data processing system and method of the invention, the user's mobile communication apparatus can automatically switch into the regional layout image corresponding to the sub-region as the user passes the sub-region.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A data processing method for generating a guiding network, comprising the steps of:

uploading a regional layout image;

based on the regional layout image, labeling M rational coordinates, wherein M is a natural number;

selecting N positioning points from the M rational coordinates, wherein N is a positive integer less than or equal to M;

selecting K information triggering points from the M rational coordinates, wherein K is a positive integer less than or equal to M, (N+K) is less than or equal to M;

selectively creating a plurality of links between neighboring rational coordinates in the M rational coordinates;

generating the guiding network according to the regional layout image, the M rational coordinates, the N positioning points, the K information triggering points and the links; and generating a guiding program comprising the guiding network, wherein the guiding program is capable of being executed on a mobile communication platform;

wherein the regional layout image corresponds to a physically regional layout, in the physically regional layout, each of a plurality of identification signal transmitter is installed at one of a plurality of positions which each corresponds to one of the N positioning points and the K information triggering points, a plurality of identification codes, which each corresponds to one of the identification signal transmitters, the positioning points and the information triggering points, are uploaded, the guiding network comprises the identification codes;

wherein a user operates a mobile communication apparatus to load the guiding program therein, the mobile communication apparatus comprising the mobile communication platform and a displaying device, the mobile communication apparatus executes the guiding program to perform steps of:

on the displaying device, displaying the regional layout image and the K information triggering points;

when the mobile communication apparatus receives the identification signal transmitted from one of the identification signal transmitters, displaying a user current position on the displaying device, wherein the user current position corresponds to said one positioning point or said one information triggering point corresponding to the received identification signal; and when the user selects a destination corresponding to one of the information triggering points under a condition of displaying the user current position, determining a guiding route according to the user current position, the destination and the guiding network, and displaying the guiding route on the displaying device.

2. The data processing method of claim 1, wherein the regional layout image, the N positioning points and the K information triggering points all are assigned an identical group code, the mobile communication apparatus executes the guiding program to perform the steps of:

when the mobile communication apparatus receives said one identification signal, retrieving the group code corresponding to said one identification code first, and then displaying the regional layout image and the K information triggering points corresponding to the group code.

* * * * *